United States Patent [19]

Ormachea

[11] Patent Number: 5,755,901
[45] Date of Patent: May 26, 1998

[54] METHOD AND APPARATUS FOR CONTROLLING AN ASSEMBLY FOR BONDING A COVER MATERIAL TO FOAM

[75] Inventor: Raymond Joseph Ormachea, Warren, Mich.

[73] Assignee: Lear Corporation, Southfield, Mich.

[21] Appl. No.: 646,948

[22] Filed: May 8, 1996

[51] Int. Cl.$^6$ .................................................. B32B 31/00
[52] U.S. Cl. .............................. 156/64; 156/214; 156/245; 156/285; 156/311; 156/358; 156/359; 156/366; 156/498
[58] Field of Search ............................... 156/64, 212, 214, 156/245, 285, 311, 350, 358, 359, 366, 378, 498

[56] References Cited

U.S. PATENT DOCUMENTS

| | | | |
|---|---|---|---|
| 2,726,707 | 12/1955 | Wellons et al. | 156/366 X |
| 3,960,069 | 6/1976 | Bowyer | 156/359 X |
| 3,979,248 | 9/1976 | Kussmaul | 156/358 |
| 4,379,018 | 4/1983 | Griesdorn | 156/359 |
| 4,692,199 | 9/1987 | Kozlowski et al. | 156/245 |
| 5,372,668 | 12/1994 | Bracesco | 156/214 |

FOREIGN PATENT DOCUMENTS

| | | | |
|---|---|---|---|
| 555515 | 4/1958 | Canada | 156/366 |
| 3-101919 | 4/1991 | Japan | 156/350 |

OTHER PUBLICATIONS

"Hot Air Systems," Osram Sylvania, Inc., Product Marketing Bulletin, Nov. 1994.
"Temperature Controller," GTE Sylvania, Instruction Manual, Nov. 1994.

Primary Examiner—David A. Simmons
Assistant Examiner—Paul M. Rivard
Attorney, Agent, or Firm—Howard & Howard

[57] ABSTRACT

A method and apparatus (84, 94) for controlling an assembly for bonding a cover (22) over the undulating surface of a foam cushion (10) by controlling a ram actuator cylinder (90) to lift a ram (14) to permit placing the foam cushion (10) on a tool (18), lowering the ram (14) to pierce the cushion (10) with a plurality of needles (44), lifting the ram (14) to lift the cushion (10) which is frictionally retained on the needles (44), controlling a heater (38) to heat ambient air and ejecting the hot air from the needles (44) into the cushion (10) to elevate the temperature of the cushion. A pair of plate actuator cylinders (62) are controlled to dispose a compression plate (58) with holes (60) extending therethrough against the backside of the cushion (10) with the needles (44) extending through the holes (60). The ram (14) is lowered to place the undulating surface of the cushion (10) against an adhesive material (82) on the backside of the cover (22) so that heat is transferred from the cushion (10) to melt the adhesive (82). The ram is raised to extract the needles (44) from the cushion (10) as the compression plate (58) is maintained in place to hold the cushion (10) against the cover (22) and the tool (18) and an air cooler (70) is controlled to eject cool air from passages (68) in the compression plate (58) and into the cushion (10) to cure the adhesive (82) and bond the cover (22) to the cushion (10).

24 Claims, 9 Drawing Sheets

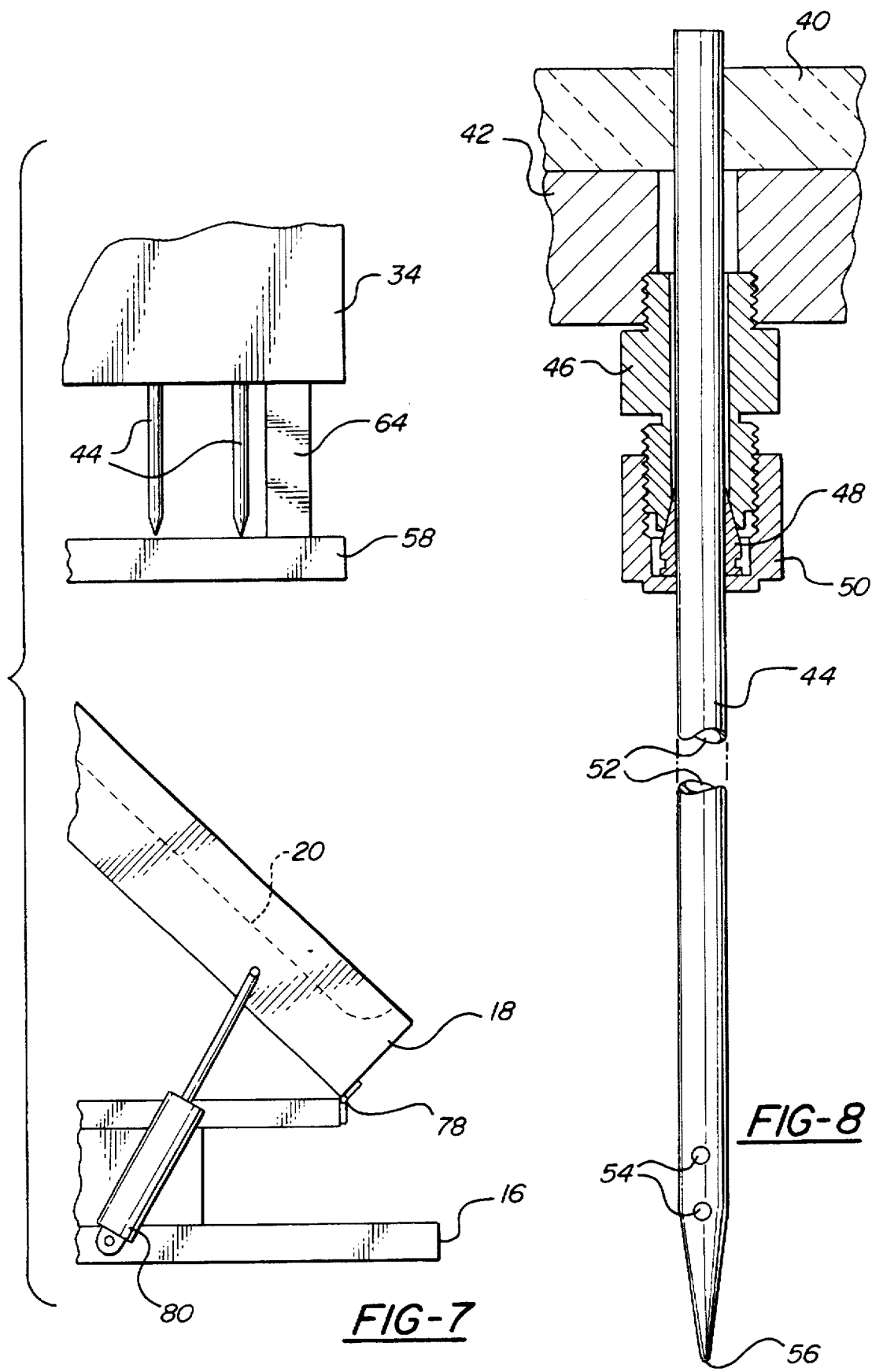

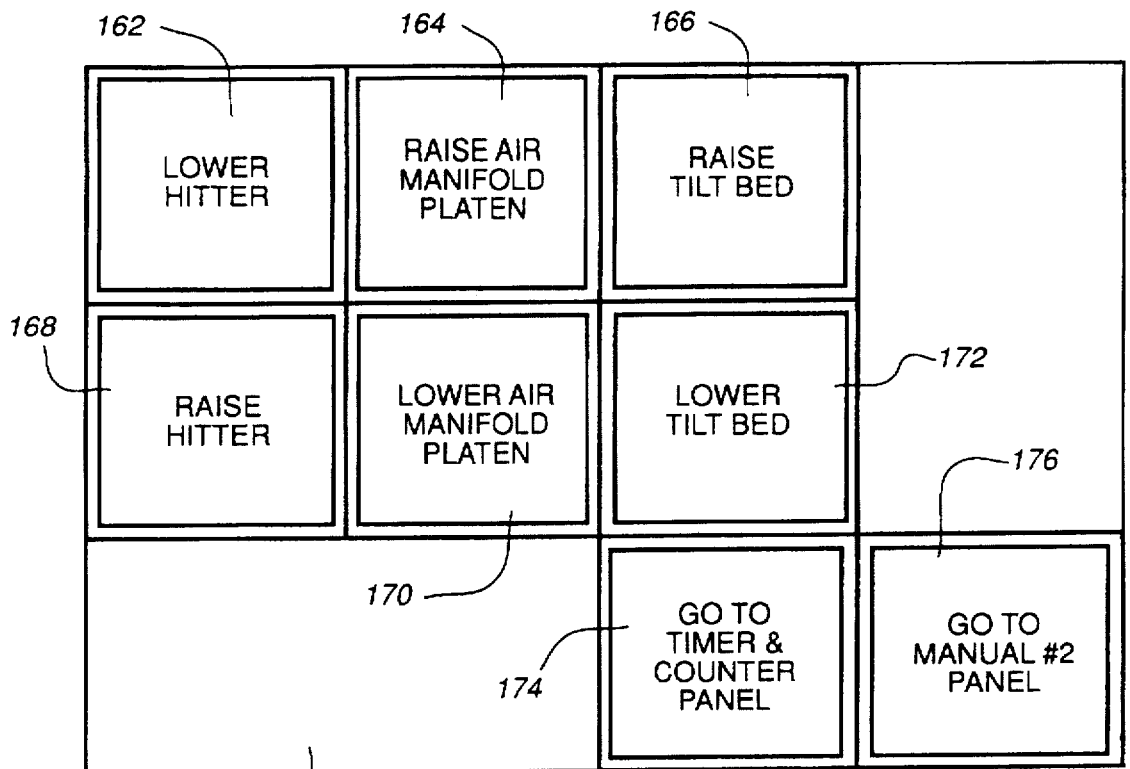
FIG-IIC
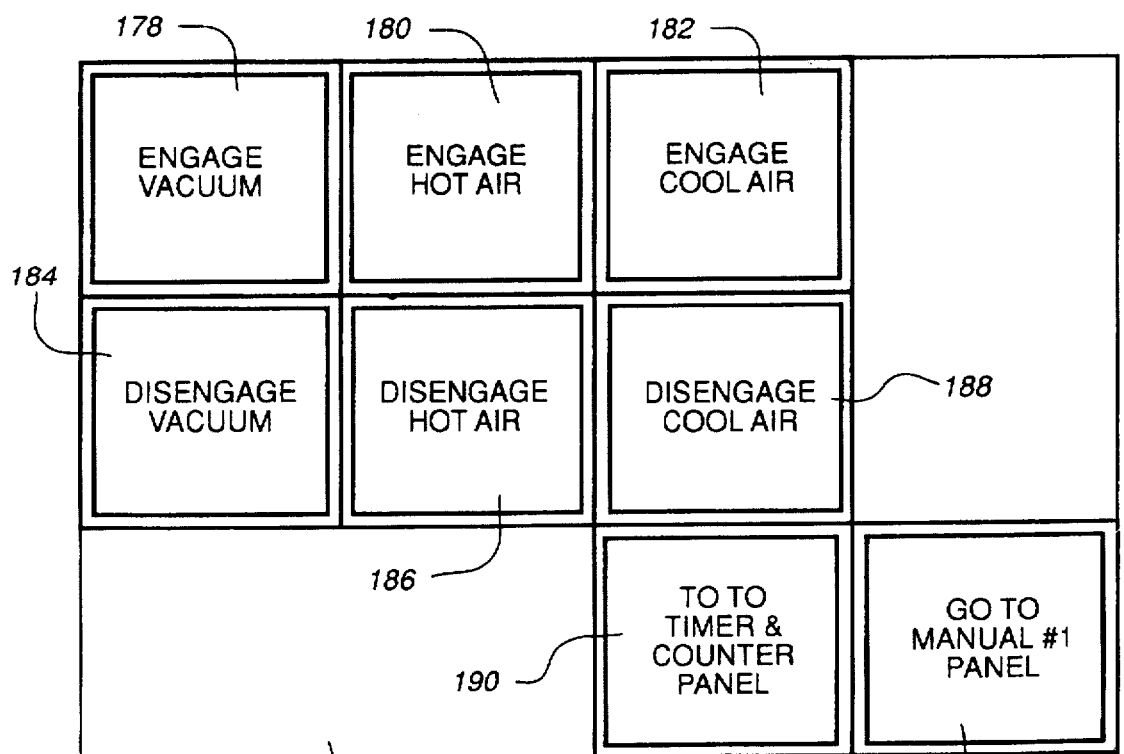
FIG-IID

METHOD AND APPARATUS FOR CONTROLLING AN ASSEMBLY FOR BONDING A COVER MATERIAL TO FOAM

BACKGROUND OF THE INVENTION

The present invention relates generally to the bonding of a cover to a cellular foam cushion or pad of the type utilized in automotive seats, armrests, and, in particular, to a method and an apparatus for controlling an assembly for performing such bonding.

A great deal of development activity has been expended to eliminate the labor intensive cut and sew methods of covering a foam cushion such as seat cushions in automotive seats. A particular segment of this development revolves around the bonding of the cover to the foam cushion.

One such method is disclosed in the U.S. Pat. No. 4,692,199 to Kozlowski et al. and assigned to the assignee of the subject invention. In accordance with the method disclosed therein, a vacuum is applied to the surface of a contoured tool or mold for drawing an impervious adhesive film against a cloth fabric layer to conform the cloth fabric layer to the contours of the tool surface. A foam cushion having a surface complementary to the tool is placed into mating engagement with the adhesive film as the film is held to the contour of the tool by the vacuum through the cloth layer. The foam cushion is held against the adhesive film, cloth layer and tool by a perforated platen and the vacuum is discontinued. Steam is then supplied through the tool to heat and melt the adhesive film for bonding the cloth layer to the foam cushion. A vacuum is then applied through the tool for removing moisture and curing the adhesive.

A modification of the above method is disclosed in the U.S. Pat. No. 5,372,668 to Bracesco wherein "the steam injection apparatus is associated with the upper mold rather than with the lower mold. . . . The upper mold is preferably provided with a plurality of cannulae which are able to pierce the foamed material constituting the padding body so as to provide a gripping action on the latter as well as the following injection of steam adjacent to the fabric." The lower mold or tool "has a greatly simplified structure" and merely applies a vacuum over the tool surface for drawing the cloth against the tool surface.

Although the known methods and apparatus are excellent for bonding a wide variety of cover materials to a foam cushion, there remain cover materials which can not be satisfactorily bonded to the foam cushion because their composition can not withstand the high temperatures and/or the moisture associated with these prior methods without unacceptable degradation.

SUMMARY OF THE INVENTION

The invention concerns an apparatus for controlling an assembly for bonding a cover of material over the surface of a foam cushion with an adhesive material. The assembly includes a support structure, a ram mounted on the support structure for vertical movement, a ram actuator cylinder coupled to move the ram, a plenum chamber attached to a lower end of the ram and having a plurality of hollow needles extending downwardly therefrom in fluid communication with the plenum chamber, an air heater attached to the ram and in fluid communication with the plenum chamber, a pair of plate actuator cylinders attached to the ram, a compression plate positioned below the plenum chamber and attached to the plate actuator cylinders for vertical movement relative to the needles, an air cooler in fluid communication with a lower surface of the compression plate, a tool hingedly mounted on the support structure, a tool actuator cylinder attached to the support structure and the tool for tilting the tool between a working position and a loading position, and a vacuum source in fluid communication with the tool through a vacuum control.

The apparatus for controlling includes an operator control means having an output and being responsive to actuation by an operator for generating command signals at the output, a CPU module connected to a bus for generating bus signals, an input module connected to the bus and having an input connected to the operator control means output for receiving the command signals and sending the command signals to the CPU module over the bus, a thermocouple adapted to be mounted in the plenum chamber for generating a feedback signal representing an actual temperature of air in the plenum chamber, a thermocouple module connected to the bus and having an input connected to the thermocouple to receive the feedback signal and send the feedback signal to the CPU module over the bus, an air heater control connected to the bus and having an output adapted to be connected to the air heater for generating a heater control signal for controlling the actual temperature of air in the plenum chamber, and an output module connected to the bus and having an output adapted to be connected to the mechanisms of the assembly for bonding. The CPU module is responsive to the command signals and the feedback signal for generating bus signals over the bus to the air heater control and to the output module, the air heater control being responsive to the bus signals for generating the heater control signal and the output module being responsive to the bus signals for generating control signals at the output module output. The control signals include signals for controlling the ram actuator cylinder to raise and lower the plenum, the plate actuator cylinders to raise and lower the compression plate, the air cooler to supply cool air to the compression plate, the tool actuator cylinder to tilt the tool between a working position and a loading position and the vacuum control to supply vacuum to the tool thereby controlling the assembly for bonding to bond the cover to the cushion with the adhesive material.

The air heater control generates the heater control signal for controlling the actual temperature at a setpoint temperature of approximately 150° F. to 160° F. The apparatus can include a printer connected to the bus for printing information generated by the CPU module. The apparatus also can include at least one switch adapted to be actuated by one of the mechanisms of the assembly for bonding and being connected to another input of the input module, the one switch generating a switch signal to the input module upon actuation and the input module sending the switch signal to the CPU module over the bus. The command signals can represent desired manual operation of the mechanisms of the assembly for bonding and the CPU module responds to the command signals to generate the control signals for controlling the mechanisms. Also, the command signals can represent desired automatic operation of the mechanisms in a predetermined sequence of steps and the CPU module responds to the command signals to generate the control signals for controlling the mechanisms in the predetermined sequence of steps.

The operator control means includes at least one operator actuated switch for generating a cycle start signal to the CPU module and the CPU module responds to the cycle start signal to generate the control signals for controlling the mechanisms in the predetermined sequence of steps. The one operator actuated switch can be an optical touch switch. The operator control means also includes a touch screen having a plurality of operator actuated softkeys for generating the command signals.

The invention also concerns a method of controlling such a bonding assembly including the steps of: controlling the ram actuator cylinder to move a plurality of needles attached to the ram away from the working surface of the tool to allow the cushion to be placed on the working surface with a backside of the cushion facing the ram, to move the needles to pierce the cushion and to move the ram and the cushion away from the working surface of the tool; controlling the tool actuator cylinder to tilt the tool from the working position to the loading position while spreading the finished side of the cover over the working surface of the tool and placing the adhesive material on the backside of the cover and returning the tool to the working position; controlling the heater to heat air to a predetermined temperature range at which the adhesive material melts; controlling the ram actuator cylinder to move the ram to position the cushion on the adhesive material; and applying the heated air to preheat the cushion and elevate a temperature of the cushion to melt the adhesive with the transfer of heat from the heated cushion and bond the cover to the cushion. The method includes a further step of controlling the vacuum control to apply a vacuum pressure over the working surface of the tool to draw the cover against the working surface of the tool before placing the adhesive material on the backside of the cover. The method also includes a step of controlling the plate actuator cylinder to hold the compression plate against the backside of the cushion to hold the cushion against the backside of the cover and the working surface of the tool and controlling the ram actuator cylinder to raise the ram and extract the needles from the cushion. A further step of the method includes controlling the air cooler to supply cooling fluid through the backside of the cushion to cure the adhesive material to thereby bond the cover to the cushion.

Accordingly, the subject invention provides a method and apparatus for controlling an assembly for bonding covers made of various materials which can not withstand the high temperatures or moisture of steam. A foam cushion may be pierced and supported on the needles of the assembly and heated before being placed against the adhesive to transfer heat thereto with the compression plate retaining the hot cushion against the tool as the needles are extracted. In other words, the cushion may be preheated while retained on the needles and spaced from the tool and thereafter pressed against the tool to relatively quickly melt the adhesive with only a tolerable amount of heat being transferred to the cover material. In order to avoid moisture, hot dry air may be utilized to heat the cushion.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7 is a fragmentary side elevation view showing the tool in a raised position for loading the cover and adhesive layers into the bonding assembly shown in the FIG. 1;

FIG. 8 is an enlarged view of a needle assembly utilized in the bonding assembly shown in the FIG. 1;

FIG. 11a through FIG. 11d are touch screen displays generated at the operator control panel shown in the FIG. 10.

DESCRIPTION OF THE PREFERRED EMBODIMENT

Figure 1:
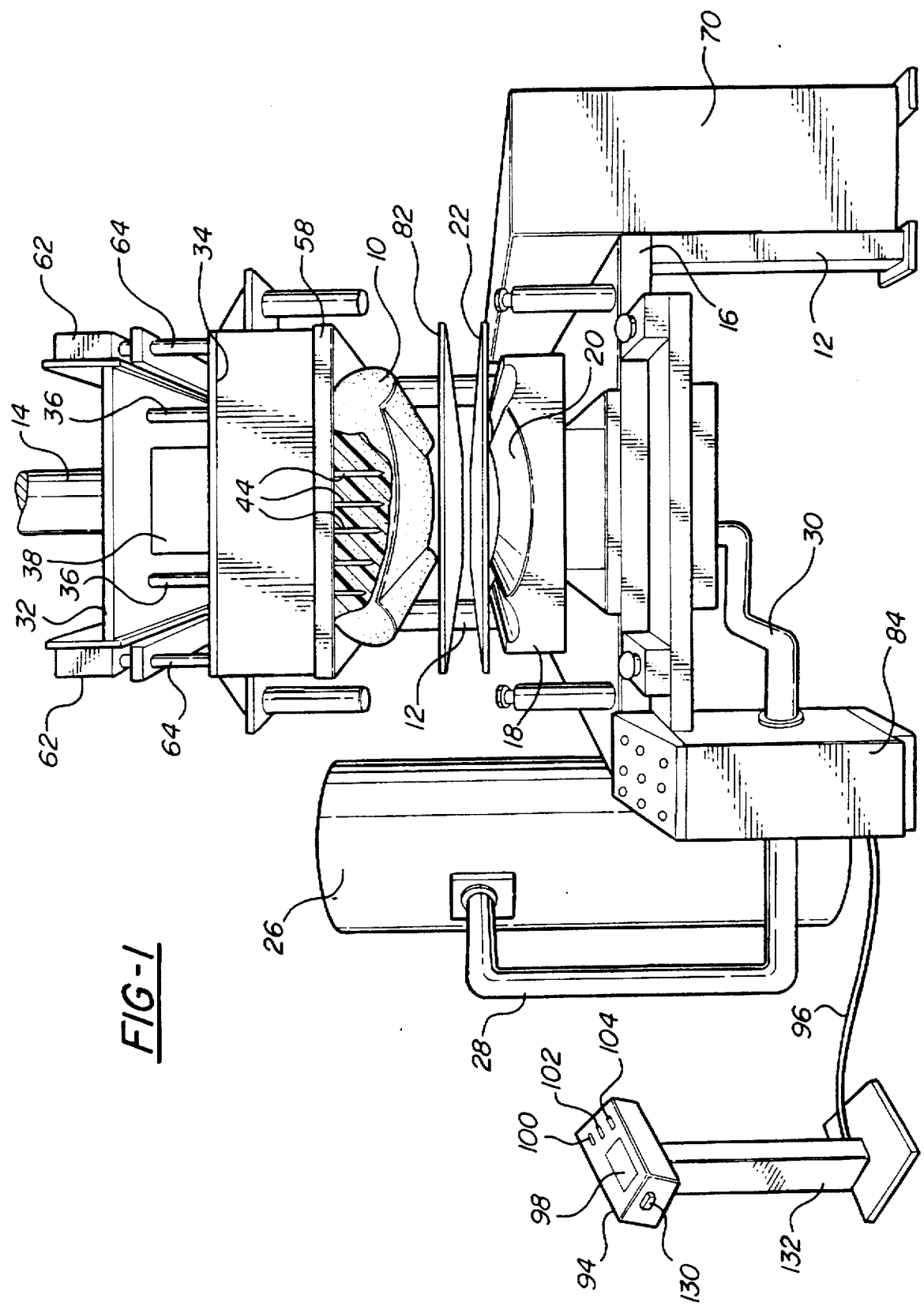
FIG. 1 is a perspective view of an embodiment of a bonding assembly showing a foam cushion retained on needles in spaced relationship to a tool and a film of adhesive and layer of cover material in exploded relationship with a control system constructed in accordance with the subject invention.

Referring to the Figures, wherein like numerals reference like or corresponding parts throughout the several views, an assembly for bonding a cover of material over the surface of a foam cushion 10 with an adhesive is generally shown in the FIG. 1. The assembly includes a support structure 12 for supporting a ram 14 and a base 16 of a press. A tool or mold 18 is supported by the base 16 and presents a working surface 20 for receiving a finished side of a cover 22. The upper working surface 20 of the tool 18 includes passages or apertures for establishing fluid communication with the working surface. The tool 18 defines a chamber 24 (FIG. 2) which is in fluid communication with a vacuum source 26 through lines 28 and 30. The tool 18 may also comprise a porous material through which fluids will flow.

The ram 14 is moved vertically by a pneumatic cylinder, or the like, to vertically position a horizontal support plate 32. A plenum chamber 34 is secured to the support plate 32 by tie rods 36 so that the plenum chamber is in fixed relationship to the support plate. A heater 38 is disposed between the top of the plenum 34 and the bottom of the plate 32 for heating ambient or surrounding air and supplying the hot air to the plenum. An insulating material 40 (FIG. 2) lines the interior walls of the plenum 34 to retain heat energy within the plenum, to minimize the transfer of heat energy to the surrounding environment.

The plenum 34 has a bottom wall 42 (FIG. 2) and an array of needles 44 extend through and are supported by the bottom wall. The needles 44 are, therefore, supported by the support structure 12 via the plenum 34, the tie rods 36, the support plate 32 and the ram 14. As shown in the FIG. 8, each needle 44 is adjustably supported through the bottom wall 42 by a coupling assembly which includes a fitting 46 threaded into a hole through the bottom wall with a conical collar 48 forced into radial gripping engagement with the needle body by a complementary tightening nut 50. The fitting 46, the collar 48 and the nut 50 comprise adjustment means for adjusting the distance each needle 44 extends from the bottom wall 42 of the plenum 34. Each of the needles 44 has a bore 52 therein for conveying heated fluid from the plenum 34 to ejection ports 54 in the needles for heating the interior of the cushion 10. Each needle 44 also terminates in a lower pointed end 56 for piercing the cushion 10. The working surface 20 of the tool 18 undulates to complement the contour of the seat cushion 10. Accordingly, the needles 44 extend various different distances from the bottom wall 42 whereby the pointed bottom ends 56 of the needles are spaced substantially equal distances from the working surface 20 of the tool 18. All of the bores 52 in the needles 44 are of equal dimension and of equal length to equalize the various mass flow rates through all of the needles. In order to accomplish this feature, the needles 44 likewise extend into the plenum 34 various different distances. In this manner, equal amounts of heat are ejected from all of the needles 44 whereby the area of cushion 10 surrounding each needle is heated at the same rate and to the same degree as the areas surrounding all other needles.

Figure 2:
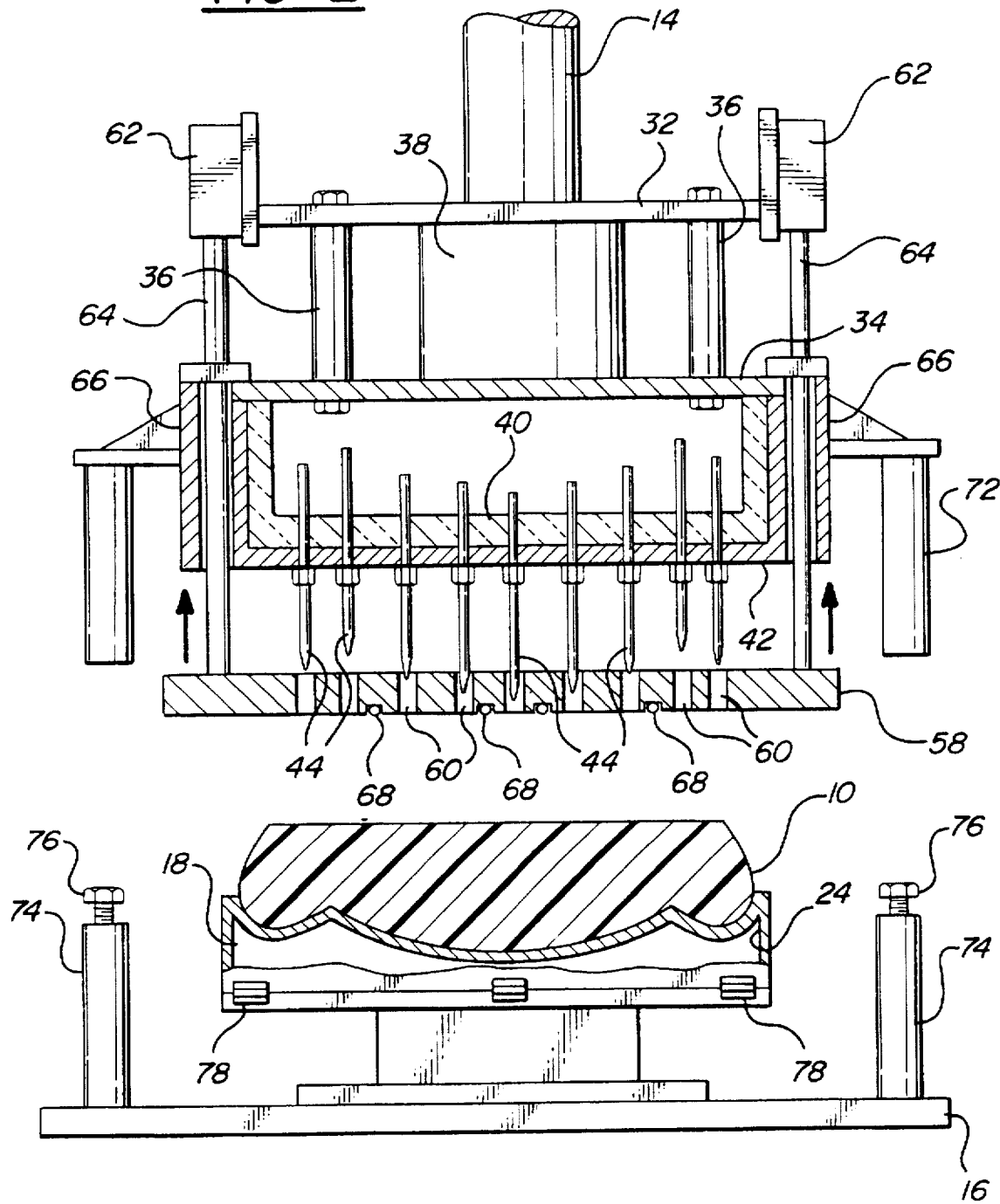
FIG. 2 is a fragmentary enlarged elevation view partially in cross section of the bonding assembly shown in the FIG. 1 showing a foam cushion on the tool and ready to be picked up by the needles.

As shown in the FIG. 2, the assembly for bonding is characterized by a compression plate 58 having holes or apertures 60 extending therethrough with the needles 44 extending through the holes. A mounting mechanism comprising a pair of plate actuator cylinders 62 allows movement of the compression plate 58 relative to the needles 44 to hold the cushion 10 against the cover 22 and the tool 18 as the needles are extracted from the cushion, as best illustrated in the FIG. 6. Each actuator 62 is attached to the support plate 32 of the ram 14 with a rod 64 extending downwardly through guides 66 in the corners of the rectangular plenum 34 to support the compression plate 58 under the bottom wall 42 for vertical movement relative to the bottom wall of the plenum.

As shown in the FIG. 2, the compression plate 58 includes tubes 68 defining passages for ejecting cool fluid into the backside of the cushion 10. An ambient air cooler 70 (shown in the FIG. 1) is in fluid communication with the tubular passages 68 for supplying cool air to the passages in the compression plate 58. The air cooler 70 cools ambient or the surrounding air to supply relatively cold air to the compression plate 58.

A plurality of upper stops 72 depend from the ram 14 through the plenum 34 and are aligned with lower stops 74 which extend upwardly from the base 16 for limiting downward movement of the ram to prevent the needles 44 from engaging the tool 18. Adjusting screws 76 adjust the stop position.

Figure 6:
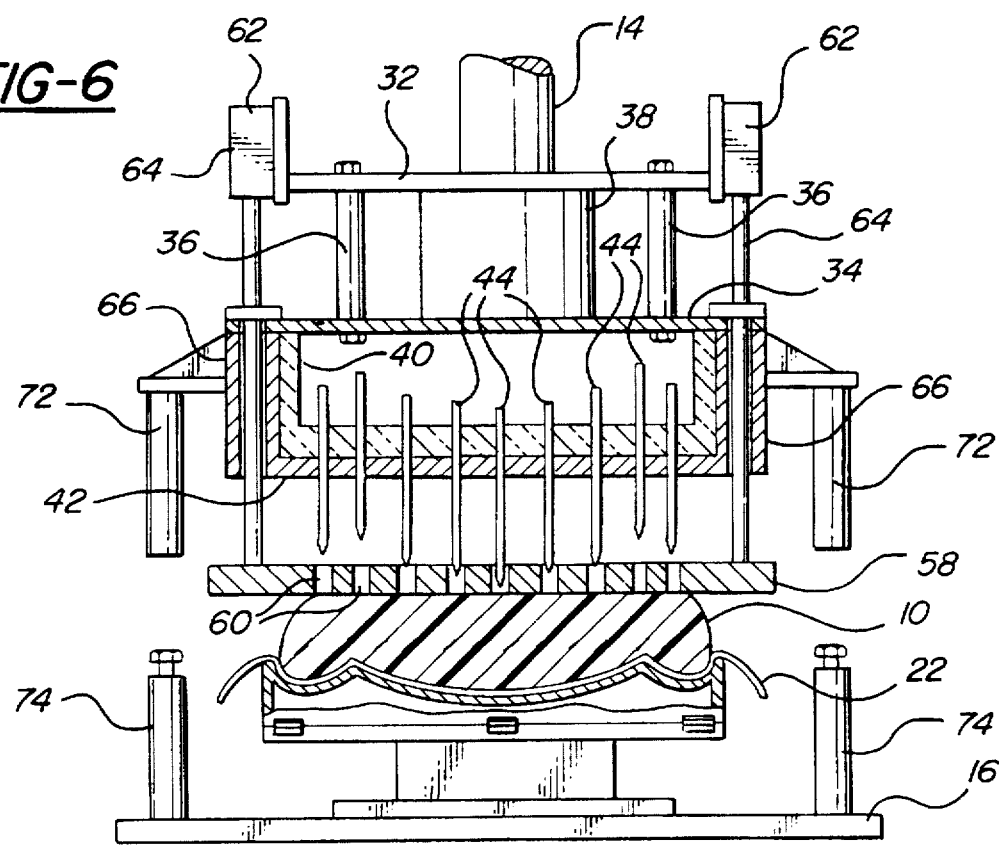
FIG. 6 is a view similar to the FIG. 5 but showing the needles extracted from the cushion as the cushion is held to the tool by the compression plate.

A tool support is included for moving the tool 18 back and forth between a working position beneath the needles 44, shown in the FIG. 1 through the FIG. 6, and a loading position with the working surface 20 thereof facing generally forwardly, as shown in the FIG. 7. The tool support comprises a plurality of hinges 78 interconnecting the tool 18 and the base 16 and at least one tool actuator cylinder 80 for tilting the tool upwardly to the inclined and forwardly facing position shown in the FIG. 7.

Figure 4:
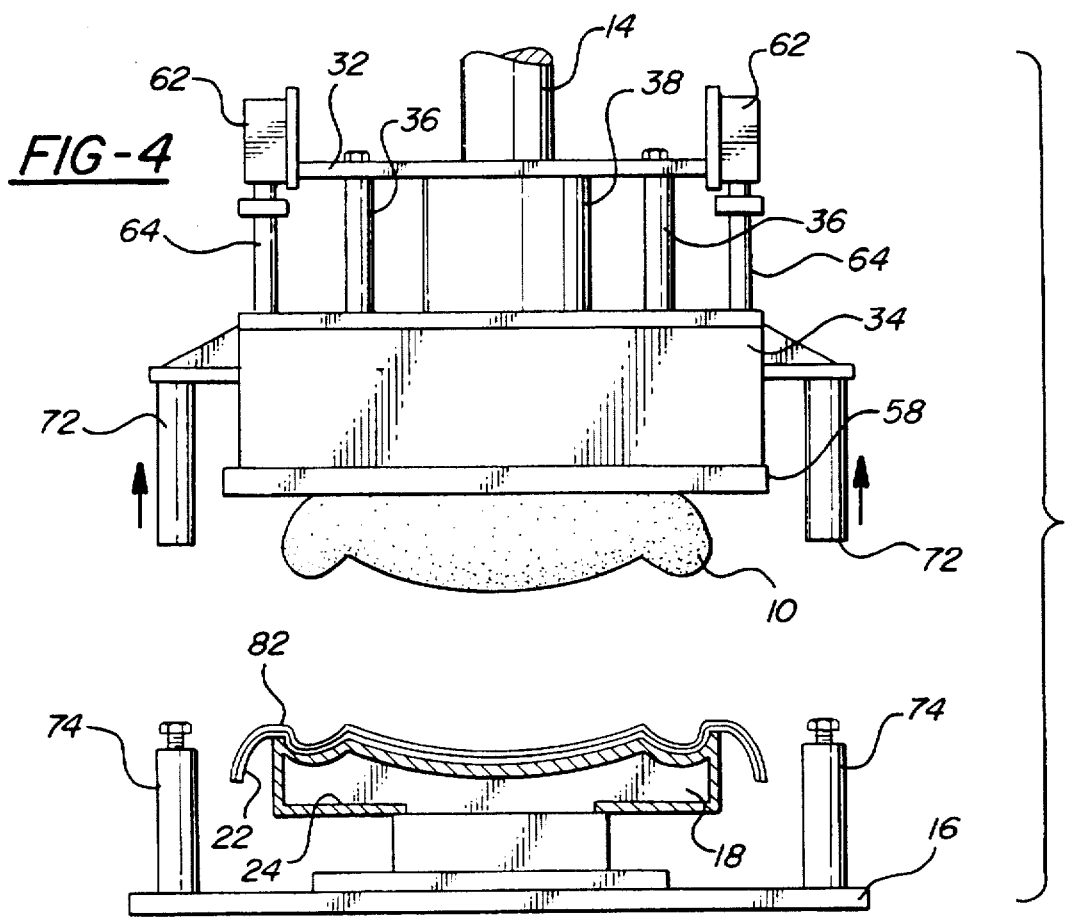
FIG. 4 is a view similar to the FIG. 3 but showing the cushion suspended in space above the tool and the tool loaded with a layer of cover material and a layer of adhesive material.

The cover 22 is bonded over the undulating surface of the foam cushion 10 utilizing a layer of adhesive material 82 (FIG. 1 and FIG. 4) in accordance with a method comprising a varying sequence of the steps, i.e., the steps may be sequential, simultaneous, or varying in order. As shown in the FIG. 1, the assembly includes an assembly control means 84 for sequencing the various steps. The control 84 may be utilized to manually sequence the steps by manual manipulation to perform each step, as by pushing a button to execute the actuation of each of the ram 14, the actuators 62 and 80, the heater 38, the vacuum source 26, the air cooler 70, etc. Alternatively, the control 84 may be fully automatic to perform the steps in the desired sequence.

Figure 9:
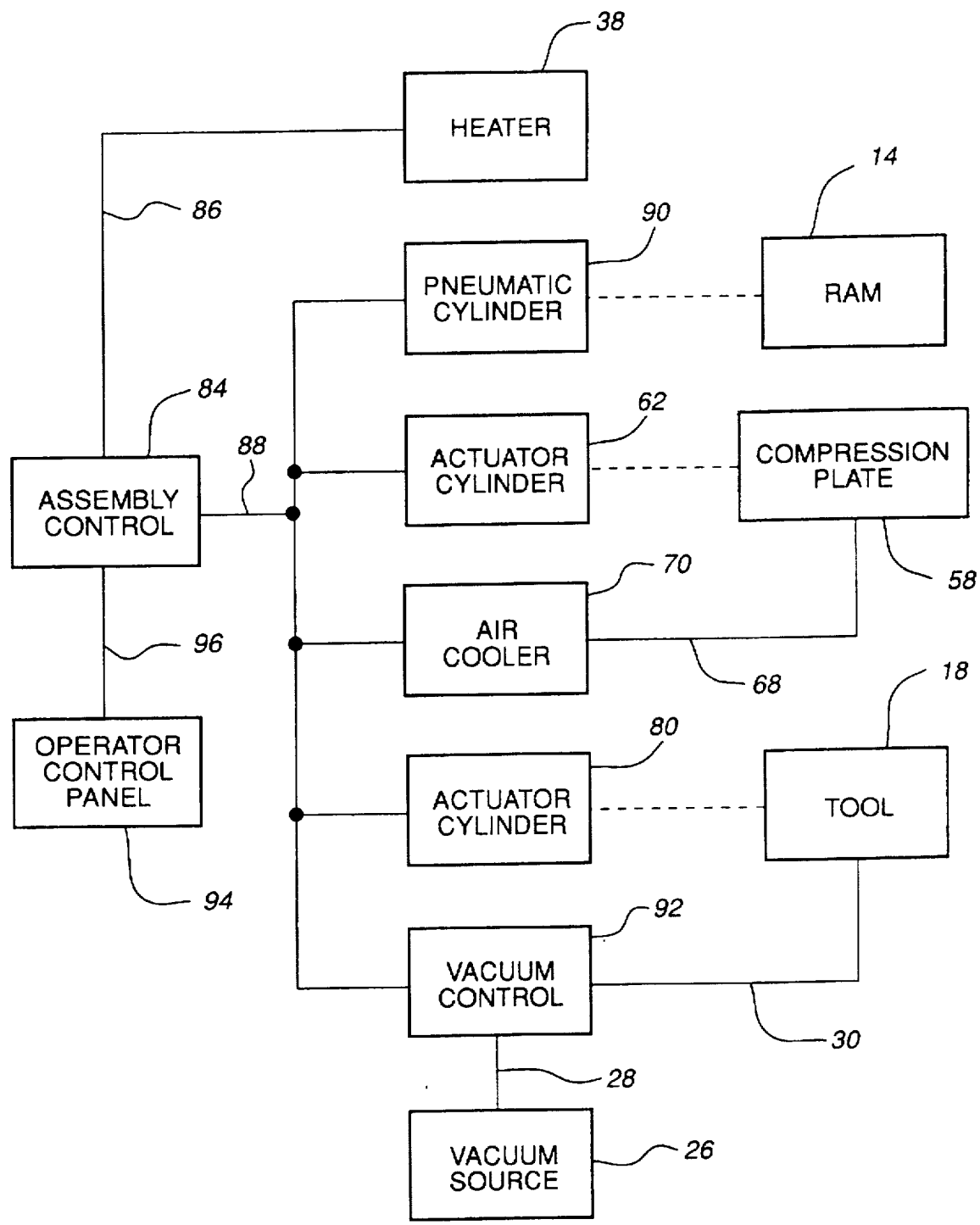
FIG. 9 is a schematic block diagram showing interconnections between the control system and the operating components of the bonding assembly shown in the FIG. 1.

As shown in the FIG. 9, the assembly control means 84 is connected to control a plurality of mechanisms in the bonding assembly. For example, the control means 84 is connected to the heater 38 by a heater signal line 86 for generating a heater control signal to control the temperature of the air in the plenum chamber 34. The control 84 also is connected to a control signal line 88 to generate various control signals to execute the actuation of each of the ram 14, the actuators 62 and 80, the vacuum source 26, the air cooler 70, etc. Accordingly, the line 88 is connected to a pneumatic cylinder 90 which is mechanically coupled to the ram 14. Thus, the control 84 generates control signals over the line 88 to cause the cylinder 90 to lower and raise the ram 14 and the attached plenum 34 during the bonding process. The line 88 is connected to the plate actuator cylinders 62 which are mechanically coupled to the compression plate 58 as described above. Thus, the control 84 generates control signals over the line 88 to cause the cylinders 62 raise and lower the plate 58 relative to the plenum 34 and the needles 44. The line 88 is connected to the air cooler 70 which is in fluid communication with the compression plate 58 via the tubes 68 as described above. Thus, the control 84 generates control signals over the line 88 to cause the air cooler 70 to cool ambient air and supply the cooled air to the plate 58. The line 88 also is connected to the tool actuator cylinder 80 which is mechanically coupled to the tool 18 as described above. Thus, the control 84 generates control signals over the line 88 to cause the cylinder 80 to tilt the tool 18 between the working position and the loading position. The vacuum source 26 is in fluid communication with a vacuum control 92 via the line 28 and the vacuum control is in fluid communication with the tool 18 via the line 30. Thus, the control 84 generates control signals over the line 88 to cause the vacuum control 92 to generate a vacuum in the vacuum source 26 and to connect the vacuum source to the tool 18. An operator control means such as an operator control panel 94 is connected to the control 84 by a line 96 for manual or automatic control of the bonding process. An operator inputs commands into the control panel 94 to generate command signals to the control means 84 over the line 96. Each of the actuator cylinders 62, 80 and 90 can be of any suitable type such as pneumatic, hydraulic and electric powered.

Figure 10:
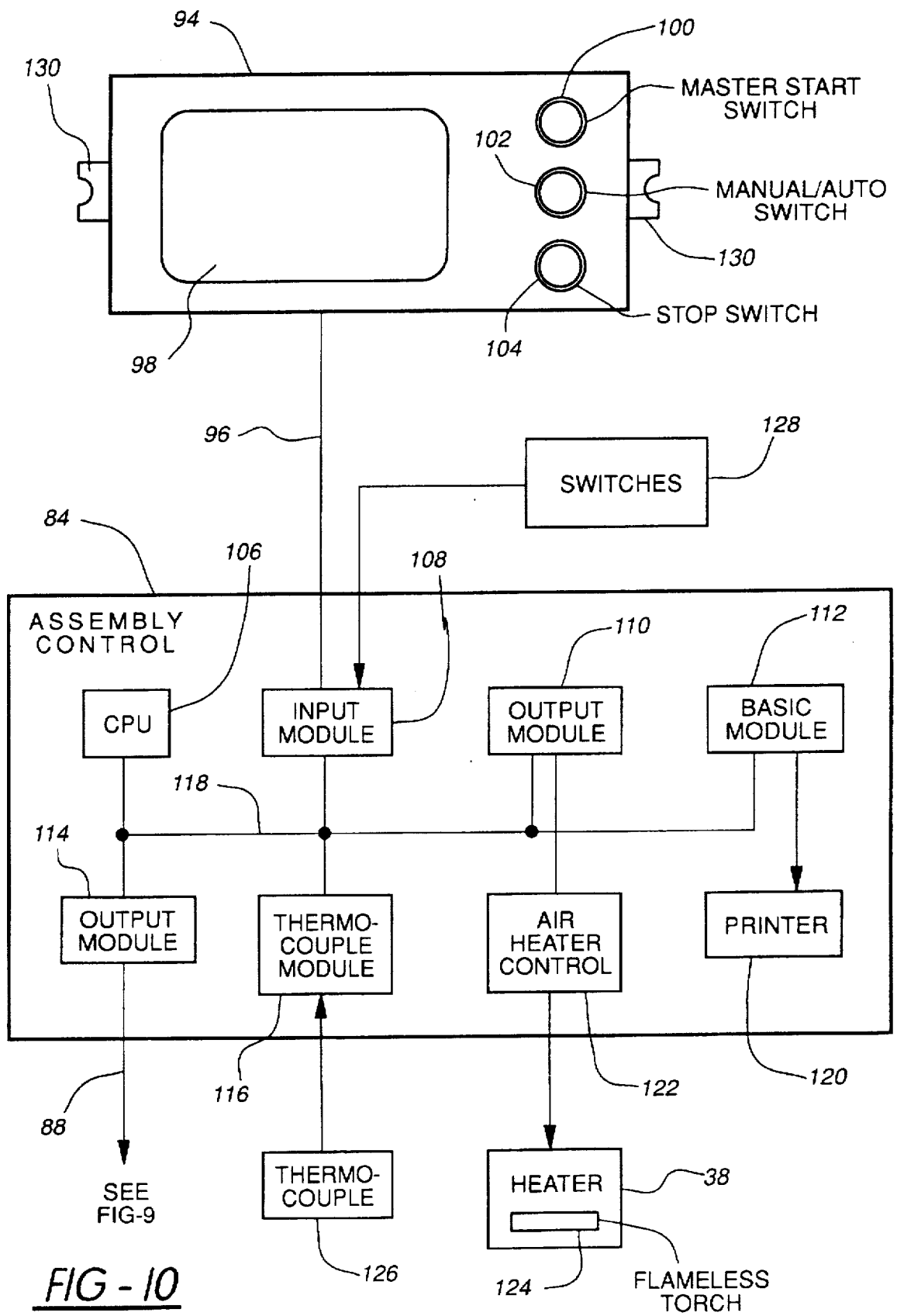
FIG. 10 is a schematic block diagram of the control system shown in the FIG. 9.

The control system for the bonding assembly is shown in more detail in the FIG. 10. The operator control panel 94 includes a touch screen 98 and three switches 100, 102 and 104 for use by an operator in controlling the bonding assembly during the bonding process. The touch screen 98 is a model QUICKPANELjr. available from Total Control Products, Inc. of Melrose Park, Ill. for displaying information and providing softkeys. The switch 100 is a master start switch which the operator actuates to activate the control system. The switch 102 is a manual/auto switch which permits the operator to select manual or automatic operation of the bonding assembly. The switch 104 is a stop switch which the operator can actuate to stop the operation of the bonding assembly.

The assembly control 84 includes a programmable controller of the SLC-500 type available from Allen Bradley. The touch screen 98 and the switches 100, 102 and 104 are connected to the control 84 by the line 96 which includes a 1747-PIC interface converter and a 1747-AIC link coupler available from Allen Bradley at each end thereof. The control 84 includes an SLC 5/03 CPU module 106, a 1746-IA16 input module 108, 1746-NO4I analog current output module 110, a 1746-BAS Basic language module 112, a 1746-OW16 output module 114 and a 1746-NT4 thermocouple module 116 all available from Allen Bradley. The modules 106 through 116 can be installed in a 1746-A7 7-slot rack with a 1746-P1 power supply also available from Allen Bradley. The modules are connected to a bus 118 for communication of signals and information related to the operation of the bonding assembly.

Also included in the control 84 is a printer 120 and an air heater control 122. The printer 120 is a model 6710 Digitec connected to an output of the Basic language module 112 for printing reports of information gathered during the bonding process. The air heater control 122 has an input connected to an output of the output module 110 and an output connected to an input of the heater 38. The air heater control 122 and a flameless torch 124 in the heater 38 are components of a Series 68 flameless torch system available from Therme, Inc. of Wilmington, Del. The air heater control 122 generates the heater control signal which regulates the temperature of the flameless torch 124 in the heater 38 in response to a feedback signal from a thermocouple 126 connected to an input of the thermocouple module 116. The thermocouple 126 is a type J thermocouple probe available from Omega Engineering, Inc. and is mounted in the plenum chamber 38 to monitor the actual temperature of the heated air being supplied to the needles 44. The output module 88 is connected by the line 88 to generate control signals to the pneumatic cylinder 90, the actuators 62 and 80, the vacuum control 92 and the air cooler 70 shown in the FIG. 9. The input module 108 is connected to a plurality of switches 128 which sense various operations of the bonding assembly such as the position of a safety gate (not shown), the tilt of the tool 18, the position of the compression plate 58 and the position of the ram 14 and generate corresponding switch signals. The input module 108 also receives cycle start signals over the line 96 generated by actuation of a pair of cycle start buttons 130 in the form of optical touch switches mounted on opposite sides of the control panel 94. The CPU module 106 is programmed to respond to the signals input from the control panel 94, the thermocouple 126 and the switches 128 and to generate the appropriate bus signals on the bus 118 to generate control signals on the line 88 through the output module 114, to control the operation of the printer 120 and to control the operation of the air heater control 122. Of course, in the FIG. 9 and the FIG. 10, any of the lines for carrying electrical signals can be of the single conductor type for serial communication or of the multiple conductor type for parallel communication depending upon the inputs and outputs to which such lines are connected.

Figure 3:
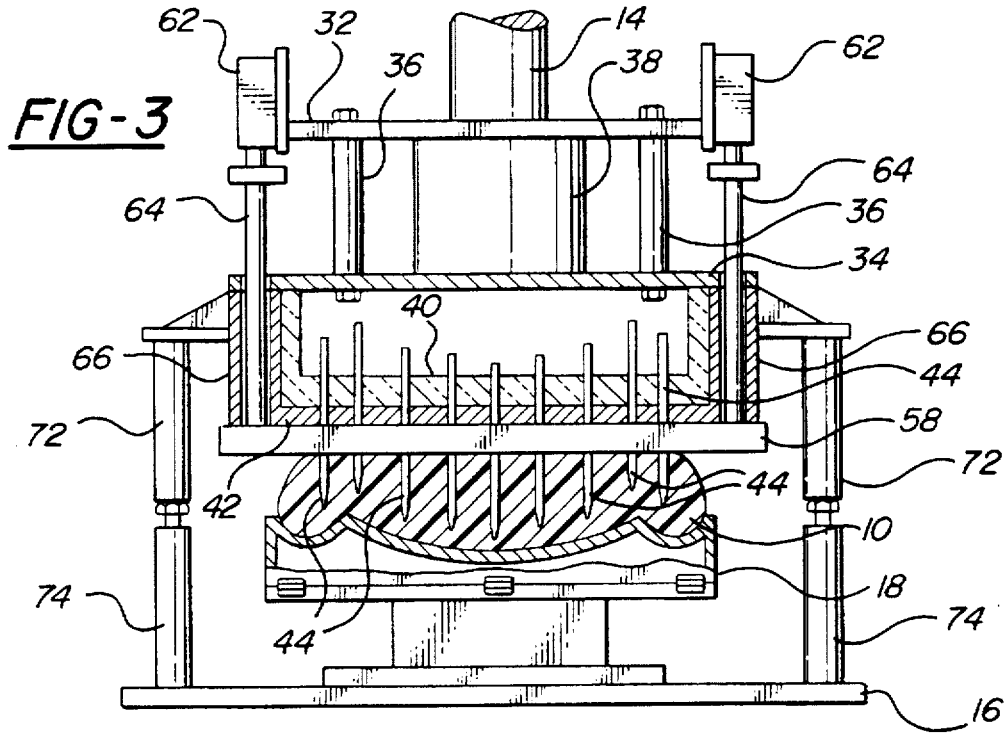
FIG. 3 is a view similar to the FIG. 2 but showing the needles piercing the cushion for picking the cushion off the tool.

The control system according to the present invention operates in an automatic mode selected through operator actuation of the switch 102 on the control panel 94. The operator actuates the switch 100 to activate the control system. As shown in the FIG. 2, the pneumatic cylinder 90 is actuated to place the ram 14 in the raised position so that the operator can place the foam cushion 10 on the working surface 20 of the tool 18. Furthermore, the compression plate 58 is raised by the plate actuators 62 to engage or be next adjacent to the bottom wall 42 of the plenum 34 before the cushion 10 is placed upon the tool 18. The operator then closes a safety door or gate (not shown) and presses the cycle start buttons 130. The control system lowers the support plate 32 and plenum 34, as shown in the FIG. 3, causing piercing of the cushion 10 with the plurality of needles 44. Thereafter, the ram 14 lifts the plenum 34 and the needles 44 to raise the cushion 10 from the tool 18 as the cushion is frictionally retained on the needles. The operator opens the safety door and the tool 18 is tilted automatically to the loading position shown in the FIG. 7.

Figure 5:
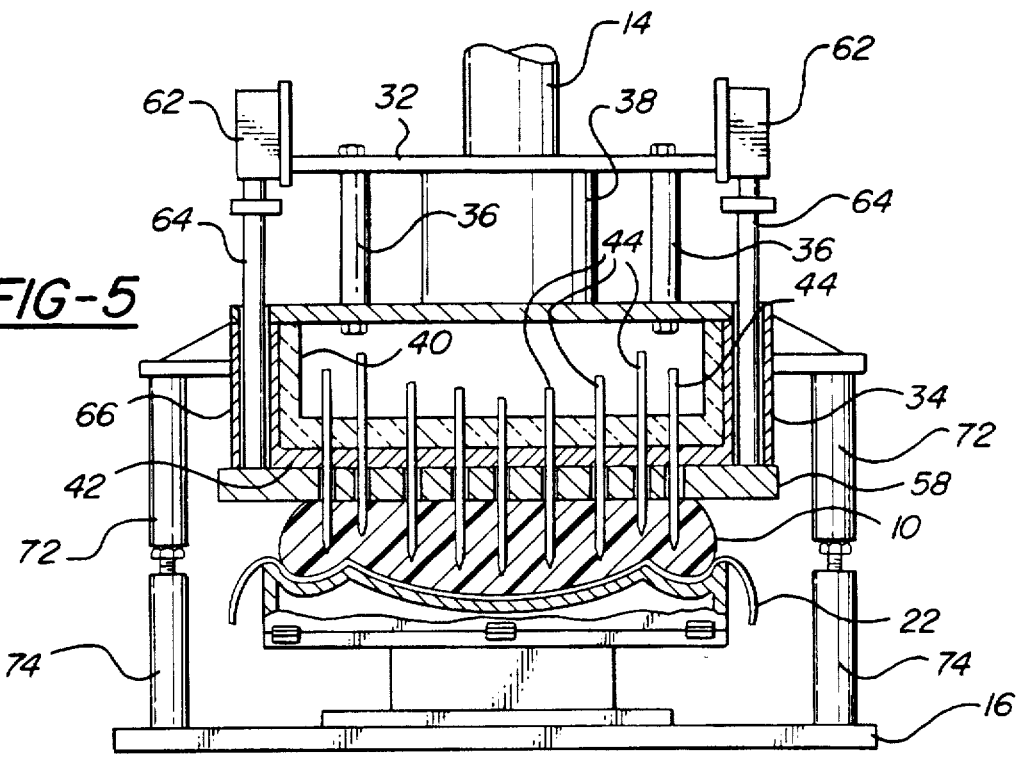
FIG. 5 is a view similar to the FIG. 4 but showing the heated cushion against the cover with the adhesive having been melted and diffused thereinto.

The operator loads the cover 22 onto the working surface 20, turns on the vacuum control 92, loads the adhesive material 82 and makes any final adjustments to the position of the cover. The operator presses the cycle start buttons 130 which lowers the tool 18 to the horizontal working position. The operator closes the safety gate and the control system automatically lowers the plenum 34, as shown in the FIG. 5, and turns on the hot air for a predetermined variable time period. The flameless torch 124 in the heater 38 heats air to a temperature approximately 150° F. to 160° F. and that heated air is supplied to the needles 44 to soften the adhesive material 82. Then the control system applies the cool air for an adhesive solidification predetermined variable time period. During this time, vacuum pressure is applied over the working surface 20 of the tool 18 to draw the cover 22 against the working surface. The vacuum is created by the vacuum source 26 and is communicated through the fluid lines 28 and 30 to a plenum (not shown) below the tool 18 which is in fluid communication with the interior chamber 24 of the tool. The vacuum is applied over the working surface 20 of the tool 18 through passages or apertures in the top wall of the tool, or through pores in the tool in the case of a porous tool. In the situation where the cover 22 is permeable to air flow, the adhesive material 82 is an air impervious film to react with the vacuum applied thereto to pull the cover down against the working surface 20 of the tool 18. In the situation where the cover 22 is impervious to air, as in the case of leather, the adhesive material 82 may be a paste or the equivalent as the vacuum reacts directly with the impervious cover. In either case, the cover 22 is made smooth and free of wrinkles over the working surface 20 of the tool 18 by the operator while under the influence of the vacuum.

At the end of the solidification period, the plenum 34 is raised while the compression plate 58 is lowered to remove the cushion from the needles 44. Relatively quickly, therefore, the ram 14 is actuated to perform the step of extracting the needles 44 from the cushion 10, as shown in the FIG. 6. During this step, the actuators 62 assure the holding of the compression plate 58 against the backside of the cushion 10 to hold the undulating surface of the cushion against the cover 22 and the tool 18 as the needles 44 are extracted. The air cooler 70 continually operates for cooling ambient air to provide cool or cold air so that immediately upon the hot needles 44 being extracted from the cushion 10, cold air is ejected from the passages 68 in the compression plate 58 and into the cushion from the backside thereof to cure the adhesive and bond the cover 22 to the cushion. Then, the compression plate 58 is raised back to the position shown in the FIG. 1 and the cushion 10 with the cover 22 bonded thereto is removed from the tool 18 by the operator after the safety gate has been opened. The bonding cycle is complete and the bonding assembly and the control system are ready to repeat the cycle.

As shown in the FIG. 1, the operator control panel 94 is mounted in an enclosure at the top of a floor engaging pedestal 132 which pedestal can be positioned adjacent to the bonding assembly for convenient access by the operator. The touch screen 98 and the push buttons 100, 102 and 104 are mounted on a surface of the panel 94 tilted upwardly from horizontal for ease of viewing. The cycle start buttons 130 (only one is shown) are mounted on opposite sides of the panel enclosure. The cable 96 extends from a base of the pedestal 132 to the control 84. There are shown in the FIG. 11a through the FIG. 11d touch screen displays generated by the operator control panel 94 shown in the FIG. 10. In the FIG. 11a, the touch screen 98 is configured as an Auto Vacuum panel display having a temperature bar graph display 134 extending horizontally across an upper portion thereof with a digital temperature box directly below the bar graph for indicating the hot air temperature. Extending across the bottom of the Auto Vacuum panel display are a vacuum push button softkey 136, a printer selector switch softkey 138, a total cycle time display 140 a change panel push button softkey 142. The operator uses the vacuum softkey 136 to turn on the vacuum control 92 which changes the softkey display from ENGAGE VACUUM, as shown, to VACUUM ENGAGED. Actuation of the printer softkey 138 alternately illuminates the ENABLE and DISABLE displays and turns the printer 120 on and off. The display 140 shows the total cycle time in seconds. The change softkey 142 switches the display on the touch screen 98 to a Timer & Counter panel display as shown in the FIG. 11b.

Figure 11A:
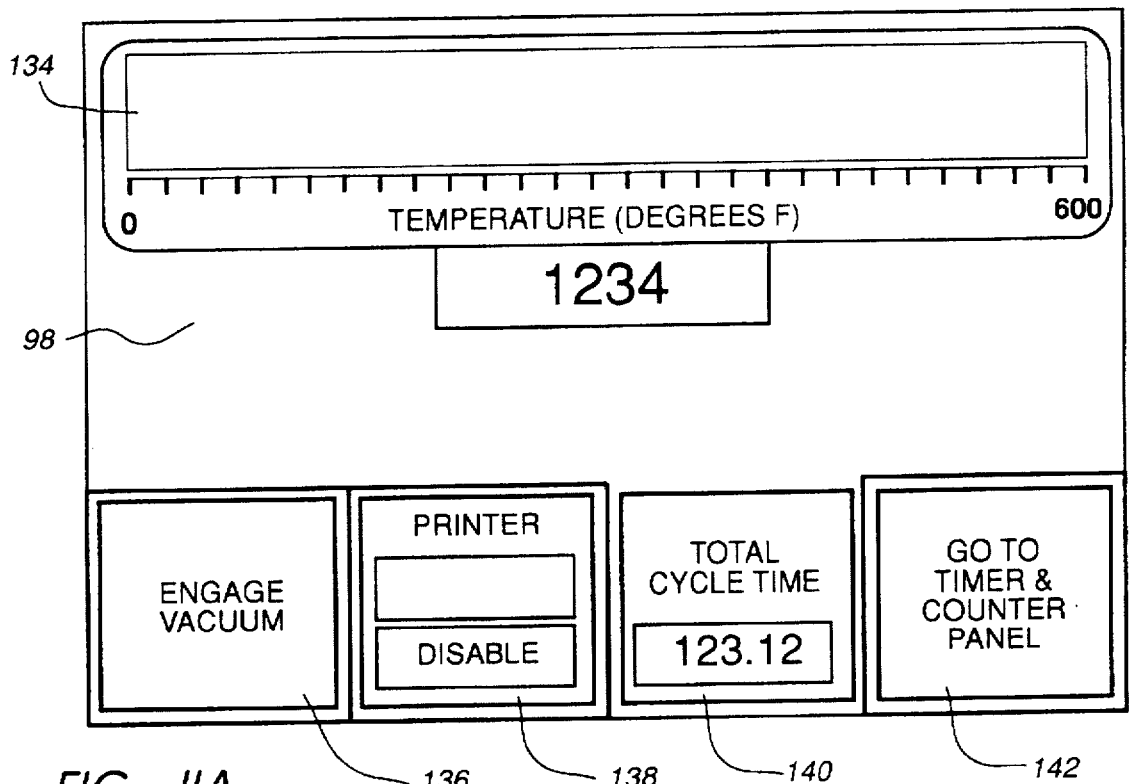
Figure 11B:
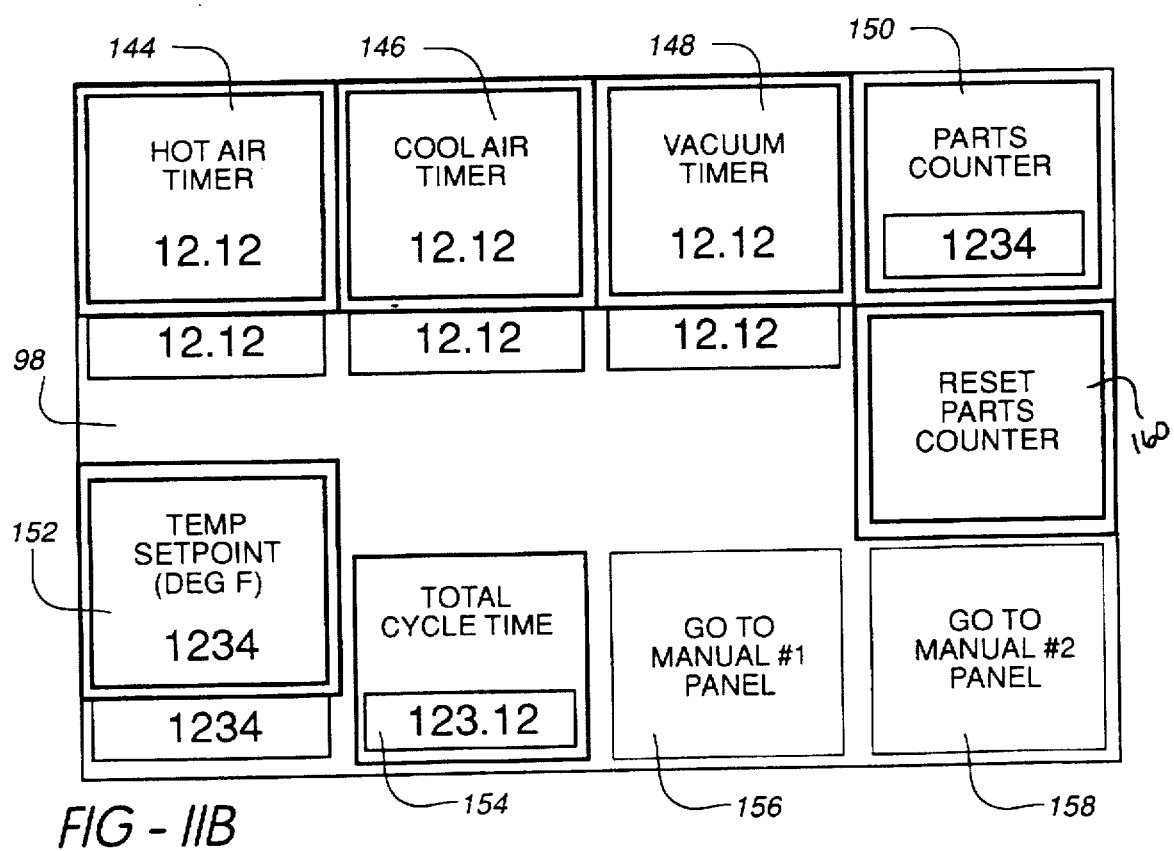

The Timer & Counter panel display in the FIG. 11b has a hot air timer push button softkey 144, a cool air timer push button softkey 146, a vacuum timer push button softkey 148, and a parts counter display 150 extending across a top portion thereof. A temperature setpoint push button softkey 152, a total cycle time display 154, a first change panel push button softkey 156, and a second change panel push button softkey 158 extend across a bottom portion of the Timer & Counter panel display. A reset parts counter push button softkey 160 is positioned between the softkeys 150 and 158. The hot air timer push button softkey 144 permits the operator to set an "on time" for the hot air and the value of the "on time" is displayed in a lower portion of the softkey. Below the softkey 144 is a digital display of the actual elapsed hot air "on time". The cool air timer push button softkey 146 permits the operator to set an "on time" for the cool air and the value of the "on time" is displayed in a lower portion of the softkey. Below the softkey 146 is a digital display of the actual elapsed cool air "on time". The vacuum timer push button softkey 148 permits the operator to set an "on time" for the vacuum to the tool 18 and the value of the "on time" is displayed in a lower portion of the softkey. Below the softkey 148 is a digital display of the actual elapsed cool air "on time". The display 150 indicates the total number of cushions 10 which have been processed through the bonding assembly and the reset softkey 160 permits the operator to reset the count total to zero.

The temperature setpoint push button softkey 152 permits the operator to set the hot air temperature and the value of the setpoint temperature is displayed in a lower portion of the softkey. The CPU 106 responds to the setpoint temperature command signal by generating control signals to the air heater control 122. Below the softkey 152 is a digital display of the actual temperature, as measured by the thermocouple 126. The total cycle time display 154 is the same as the display 140 shown in the FIG. 11a. The first change panel push button softkey 156 permits the operator to switch the display to the Manual #1 panel display shown in the FIG. 11c and the second change panel push button softkey 158 permits the operator to switch the display to the Manual #2 panel display shown in the FIG. 11d.

The Manual #1 panel display in the FIG. 11c has a lower hitter push button softkey 162, a raise air manifold platen push button softkey 164 and a raise tilt bed push button softkey 166 displayed in a top portion thereof. A raise hitter push button softkey 168, a lower air manifold platen push button softkey 170 and a lower tilt bed push button softkey 172 are displayed in a middle portion thereof. A first change panel push button softkey 174 and a second change panel push button softkey 176 are positioned in a bottom portion of the panel display. The softkeys 162 and 168 are used by the operator to manually control the actuator cylinders 62 to lower and raise respectively the compression plate 58. The softkeys 164 and 170 are used by the operator to manually control the pneumatic cylinder 90 to raise and lower respectively the ram 14 and the attached plenum 34. The softkeys 166 and 172 are used by the operator to manually control the actuator 80 to raise and lower respectively the tool 18. The first change panel push button softkey 174 permits the operator to switch the display to the Auto Vacuum panel display shown in the FIG. 11a and the second change panel push button softkey 176 permits the operator to switch the display to the Manual #2 panel display shown in the FIG. 11d.

The Manual #2 panel display in the FIG. 11d has an engage vacuum push button softkey 178, an engage hot air push button softkey 180 and an engage cool air push button softkey 182 displayed in a top portion thereof. A disengage vacuum push button softkey 184, a disengage hot air push button softkey 186 and a disengage cool air push button softkey 188 are displayed in a middle portion thereof. A first change panel push button softkey 190 and a second change panel push button softkey 192 are positioned in a bottom portion of the panel display. The softkeys 178 and 184 are used by the operator to manually control the vacuum control 92 apply vacuum to and remove vacuum from respectively the tool 18. The softkeys 180 and 186 are used by the operator to manually control the heater 38 to apply hot air to and remove hot air from respectively the cushion 10. The softkeys 182 and 188 are used by the operator to manually control the air cooler 70 to apply cool air to and remove cool air from respectively the cushion 10. The first change panel push button softkey 190 permits the operator to switch the display to the Auto Vacuum panel display shown in the FIG. 11a and the second change panel push button softkey 192 permits the operator to switch the display to the Manual #1 panel display shown in the FIG. 11c.

The operator control panel 94 provides the operator with the means necessary to select between manual and automatic operation of the bonding assembly. The Auto Vacuum panel display shown in the FIG. 11a provides means for controlling the vacuum and the printer during automatic operation and provides displays for the temperature and the total cycle time. The Timer & Counter panel display shown in the FIG. 11b provides means for setting the hot air time, the cool air time, the vacuum time and the temperature and provides displays for the parts counter and the total cycle time. The Manual #1 panel display shown in the FIG. 11c provides means for the manual control of the movement of the compression plate 58, the plenum 34 and the tool 18. The Manual #2 panel display shown in the FIG. 11d provides means for the manual control of the application of the vacuum, the hot air and the cool air.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An apparatus for controlling an assembly for bonding a cover of material over the surface of a foam cushion with an adhesive material, the assembly for bonding including a support structure, a ram mounted on the support structure for vertical movement, a ram actuator cylinder coupled to move the ram, a plenum chamber attached to a lower end of the ram and having a plurality of hollow needles extending downwardly therefrom in fluid communication with the plenum chamber, an air heater attached to the ram and in fluid communication with the plenum chamber, a pair of plate actuator cylinders attached to the ram, a compression plate positioned below the plenum chamber and attached to the plate actuator cylinders for vertical movement relative to the needles, an air cooler in fluid communication with a lower surface of the compression plate, a tool hingedly mounted on the support structure, a tool actuator cylinder attached to the support structure and the tool for tilting the tool, and a vacuum source in fluid communication with the tool through a vacuum control, the apparatus for controlling comprising;
- an assembly control means having an output adapted to be connected to a plurality of mechanisms of an assembly for bonding, the mechanisms including a ram actuator cylinder, a pair of plate actuator cylinders, an air cooler, a tool actuator cylinder and a vacuum control;
- an operator control means having an output and being responsive to actuation by an operator for generating command signals at said output; and
- a CPU module in said assembly control means connected to receive said command signals from said operator control means, said CPU module being responsive to said command signals for generating control signals at said assembly control means output, said control signals including signals for controlling the ram actuator cylinder to raise and lower a ram and an attached plenum chamber of the assembly for bonding, the plate actuator cylinders to raise and lower a compression plate of the assembly for bonding, the air cooler to supply cool air to the compression plate, the tool actuator cylinder to tilt a tool of the assembly for bonding and the vacuum control to supply vacuum to the tool for bonding a cover to a cushion with an adhesive material, said operator control means and said CPU module permitting operator adjustment of a cycle time of at least one of the mechanisms.

2. The apparatus according to claim 1 wherein said assembly control means includes an air heater control connected to said CPU module for controlling a heater to supply heated air to the plenum chamber at a setpoint temperature of approximately 150° F. to 160° F. in response to a feedback signal representing an actual temperature of the heated air.

3. The apparatus according to claim 1 wherein said command signals represent desired manual operation of at least one of the mechanisms of the assembly for bonding and said CPU module responds to said command signals to generate said control signals for controlling the at least one mechanism.

4. The apparatus according to claim 1 wherein said command signals represent desired automatic operation of the mechanisms of the assembly for bonding in a predetermined sequence of steps and said CPU module responds to said command signals to generate said control signals for controlling the mechanisms in the predetermined sequence of steps.

5. The apparatus according to claim 4 wherein said operator control means includes at least one operator actuated switch for generating a cycle start signal to said CPU module and said CPU module responds to said cycle start signal to generate said control signals for controlling the mechanisms in the predetermined sequence of steps.

6. The apparatus according to claim 5 wherein said one switch is an optical touch switch.

7. The apparatus according to claim 1 wherein said operator control means includes a touch screen having a plurality of operator actuated softkeys for generating said command signals.

8. The apparatus according to claim 7 wherein said operator actuated softkeys include softkeys for setting a cycle time for each of the air cooler and the vacuum control.

9. The apparatus according to claim 7 wherein said assembly control means includes an air heater control connected to said CPU module for controlling a heater to supply heated air to the plenum chamber at a setpoint temperature of approximately 150° F. to 160° F. in response to a feedback signal representing an actual temperature of the heated air and said operator actuated softkeys include softkeys for setting a cycle time for supplying the heated air to melt the adhesive material and for entering the setpoint temperature into the CPU module.

10. An apparatus for controlling an assembly for bonding a cover of material over the surface of a foam cushion with an adhesive material, the assembly including a support structure, a ram mounted on the support structure for vertical movement, a ram actuator cylinder coupled to move the ram, a plenum chamber attached to a lower end of the ram and having a plurality of hollow needles extending downwardly therefrom in fluid communication with the plenum chamber, an air heater attached to the ram and in fluid communication with the plenum chamber, a pair of plate actuator cylinders attached to the ram, a compression plate positioned below the plenum chamber and attached to the plate actuator cylinders for vertical movement relative to the needles, an air cooler in fluid communication with a lower surface of the compression plate, a tool hingedly mounted on the support structure, a tool actuator cylinder attached to the support structure and the tool for tilting the tool between a working position and a loading position, and a vacuum source in fluid communication with the tool through a vacuum control, the apparatus for controlling comprising;
- an operator control means having an output and being responsive to actuation by an operator for generating command signals at said output;
- a CPU module connected to a bus for generating bus signals;
- an input module connected to said bus and having an input connected to said operator control means output for receiving said command signals and sending said command signals to said CPU module over said bus;
- a thermocouple adapted to be mounted in a plenum chamber of an assembly for bonding for generating a feedback signal representing an actual temperature of air in the plenum chamber;
- a thermocouple module connected to said bus and having an input connected to said thermocouple to receive said feedback signal and send said feedback signal to said CPU module over said bus;
- an air heater control connected to said bus and having an output adapted to be connected to a heater of air for the plenum chamber for generating a heater control signal for controlling the actual temperature of air in the plenum chamber; and
- an output module connected to said bus and having an output adapted to be connected to mechanisms of the assembly for bonding, the mechanisms including a ram actuator cylinder, a pair of plate actuator cylinders, an air cooler, a tool actuator cylinder and a vacuum control, whereby said CPU module is responsive to said command signals and said feedback signal for generating bus signals over said bus to said air heater control and to said output module, said air heater control is responsive to said bus signals for generating said heater control signal and said output module is responsive to said bus signals for generating control signals at said output module output, said control signals including signals for controlling the ram actuator cylinder to raise and lower the plenum, the plate actuator cylinders to raise and lower a compression plate, the air cooler to supply cool air to the compression plate, the tool actuator cylinder to tilt the tool between a working position and a loading position and the vacuum control to supply vacuum to the tool thereby controlling the assembly for bonding to bond a cover to a cushion with an adhesive material.

11. The apparatus according to claim 10 wherein said air heater control generates said heater control signal for controlling said actual temperature at a setpoint temperature of approximately 150° F. to 160° F.

12. The apparatus according to claim 10 including a printer connected to said bus for printing information generated by said CPU module.

13. The apparatus according to claim 10 including at least one switch adapted to be actuated by one of the mechanisms of the assembly for bonding and being connected to another input of said input module, said one switch generating a switch signal to said input module upon actuation, said input module sending said switch signal to said CPU module over said bus.

14. The apparatus according to claim 10 wherein said command signals represent desired manual operation of at least one of the mechanisms of the assembly for bonding and said CPU module responds to said command signals to generate said control signals for controlling the at least one mechanism.

15. The apparatus according to claim 10 wherein said command signals represent desired automatic operation of the mechanisms of the assembly for bonding in a predetermined sequence of steps and said CPU module responds to said command signals to generate said control signals for controlling the mechanisms in the predetermined sequence of steps.

16. The apparatus according to claim 15 wherein said operator control means includes at least one operator actuated switch for generating a cycle start signal to said CPU module and said CPU module responds to said cycle start signal to generate said control signals for controlling the mechanisms in the predetermined sequence of steps.

17. The apparatus according to claim 16 wherein said one operator actuated switch is an optical touch switch.

18. The apparatus according to claim 10 wherein said operator control means includes a touch screen having a plurality of operator actuated softkeys for generating said command signals.

19. A method of controlling a bonding assembly for bonding a cover layer of material over the surface of a foam cushion comprising the steps of:

a. controlling a tool actuator cylinder to tilt a tool from a working position to a loading position while spreading a finished side of a cover over a working surface of the tool and placing an adhesive material on a backside of the cover and returning the tool to the working position;

b. controlling a heater to heat air to a predetermined temperature range at which the adhesive material melts;

c. controlling a ram actuator cylinder to move a ram to position a cushion on the adhesive material; and d. applying the heated air to preheat the cushion and elevate a temperature of the cushion to melt the adhesive with the transfer of heat from the heated cushion and bond the cover to the cushion.

20. The method according to claim 19 including a further step of controlling a vacuum control to apply a vacuum pressure over the working surface of the tool to draw the cover against the working surface of the tool before placing the adhesive material on the backside of the cover.

21. The method according to claim 19 including prior to the step a. controlling the ram actuator cylinder to move a plurality of needles attached to the ram away from the working surface of the tool to allow the cushion to be placed on the working surface with a backside of the cushion facing the ram, to move the needles to pierce the cushion and to move the ram and the cushion away from the working surface of the tool.

22. The method according to claim 19 where the step b. includes reading a feedback signal representing an actual temperature of the heated air and controlling the heater in response to a difference between the feedback signal and the predetermined temperature range.

23. The method according to claim 19 including a step of controlling a plate actuator cylinder to hold a compression plate against the backside of the cushion to hold the cushion against the backside of the cover and the working surface of the tool and controlling the ram actuator cylinder to raise the ram and extract the needles from the cushion.

24. The method according to claim 19 including a step of controlling an air cooler to supply cooling fluid through the backside of the cushion to cure the adhesive material to thereby bond the cover to the cushion.

* * * * *